United States Patent [19]
Melvin

[11] Patent Number: 4,909,868
[45] Date of Patent: Mar. 20, 1990

[54] EXTRACTION AND RECOVERY OF PLASTICIZERS FROM SOLID PROPELLANTS AND MUNITIONS

[75] Inventor: William S. Melvin, Huntsville, Ala.

[73] Assignee: The United States of America as represented by the Secretary of the Army, Washington, D.C.

[21] Appl. No.: 422,161

[22] Filed: Oct. 16, 1989

[51] Int. Cl.$^4$ ............................................. D03D 23/00
[52] U.S. Cl. .................................. 149/109.6; 264/3.1; 264/3.4
[58] Field of Search ...................... 149/109.6; 264/3.1, 264/3.4

[56] References Cited

U.S. PATENT DOCUMENTS

| H,273 | 5/1987 | Melvin et al. | 149/109.6 |
|---|---|---|---|
| H,305 | 7/1987 | Mitchel et al. | 149/109.6 |
| 3,335,185 | 8/1967 | Dykes | 260/576 |
| 3,711,344 | 1/1973 | Pierce | 149/19 |
| 4,293,352 | 10/1981 | Lee et al. | 149/92 |
| 4,349,396 | 9/1982 | Mueller | 149/44 |
| 4,376,666 | 3/1983 | Williams, Jr. | 149/109.6 |
| 4,389,947 | 6/1983 | King | 89/36.01 |
| 4,854,982 | 8/1989 | Melvin et al. | 149/109.6 |

OTHER PUBLICATIONS

Mark A. McHugh and Val Krukonis, "Supercritical Fluid Extraction", Principles and Practice, Boston: Butterworth Publisher, 1986, pp. 188–192.

John Moses et al, "Case Study: Site Program Puts Critical Fluid Solvent Extraction to the Test", Hazardous Waste Management Magazine/Jan–Feb 1988, pp. 30 and 32.

*Primary Examiner*—Stephen J. Lechert, Jr.
*Attorney, Agent, or Firm*—Freddie M. Bush; James T. Deaton

[57] ABSTRACT

A method to extract and recover plasticizers and their stabilizers from solid propellants, explosives, and pyrotechnics (PEP source compositions) employs near critical liquid (NCL) or supercritical fluid (SCF) $CO_2$ as the solvent. The extraction and ingredient recovery method provides an environmentally acceptable alternative to traditional open burning and destruction of PEP source compositions. $CO_2$ solvent is nontoxic, nonflammable, noncorrosive, inexpensive, and does not generate any additional toxic or hazardous wastes. The solvent is totally inert when it is confined, pressurized, and possibly heated in direct contact with an energetic propellant or munition within a rocket motor or similar pressure vessel. $CO_2$ readily undergoes a gas-to-liquid phase change to NCL conditions when confined and compressed to a pressure of 831 psig or greater at ambient temperature. By further increasing the pressure and temperature of NCL $CO_2$ to 1058 psig and 31.3° C. or greater, respectively, SCF conditions of $CO_2$ are obtained. Either NCL or SCF $CO_2$ has the capability to be a selective solvent for soluble plasticizers (e.g., nitroglycerin) and their stabilizers (e.g., diphenylamines and nitroanilines) from double base and crosslinked double base propellants, munitions and pyrotechnics. All undissolved propellant and munition ingredients are filtered from the NCL or SCF $CO_2$ solvent prior to the pressure reduction/volume expansion recovery cycle. The recovery of soluble plasticizers and stabilizers from a NCL or SCF $CO_2$ solvent system is achieved by allowing the NCL or SCF solvent to undergo pressure reduction and phase change to the gaseous state. The gaseous $CO_2$ is then recycled for additional use in the method.

14 Claims, 2 Drawing Sheets

EXTRACTION AND RECOVERY OF PLASTICIZERS FROM SOLID PROPELLANTS AND MUNITIONS

The invention described herein may be manufactured, used, and licensed by or for the Government for governmental purposes without the payment to me of any royalties thereon.

BACKGROUND OF THE INVENTION

Solid propellant technology has evolved around the use of components readily available at the time of development and use. The surplus materials following World War II included gun powder, nitrocellulose, and other explosive ingredients. The availability of these materials motivated research for their use in solid propulsion technology. As these materials were used in solid propellants, the need for stabilizers was recognized. When stabilizers are used then a need is established for determining their change to ascertain the efficiency in stabilizing the propellant composition.

A patent of interest in the stabilizer technology field which is assigned to the United States of America as represented by the Secretary of the Army is U.S. Pat. No. 3,335,185. This patent was issued to Hiram W. H. Dykes on Aug. 8, 1967 and relates specifically to recovery of stabilizers such as diphenylamine and resorcinol. In the method disclosed by this patent a small propellant sample (e.g., 100 mg.) is first dissolved in a suitable inert organic solvent having a low boiling point, acetone being preferred. The separation of the stabilizers is accomplished by specific materials known as developers in a thin-layer chromatography method. The developers are selected from the normal eluotropic series which is generally made up of a listing of solvents ranging from low polarity to high polarity. The developers are selected from the group consisting of n-hexane, carbon disulfide, carbon tetrachloride, trichloroethylene, toluene, benzene, methylene chloride, chloroform, ether, ethyl acetate, methyl acetate, aceton, n-propyl alcohol, ethyl alcohol, methyl alcohol and water.

Although the above method serves to separate and identify specific ingredients in small amounts, the separation and reclamation of massive amounts of propellant ingredients has not been of major concern since, prior to the use of very expensive specialty ingredients, the normal disposal of of hazardous munitions and ingredients centered around open burning and open destruction (OB/OD). However, after environmental controls were implemented, and with expectation of further controls in the future, the need for a different approach for demilitarization and disposal of surplus and reject propellants, explosives, and energetic materials has become a major driving force.

The advancements of new technologies relating to propellant processing and reclamation of special ingredients from propellants highly loaded with particulate solids are disclosed in my co-inventions as follows:

a. Statutory Invention Registration, Reg. Number H273, published on May 5, 1987, discloses "Processing of High Solid Propellant" by William S. Melvin and Porter H. Mitchell. This process relates to mixing of high solids loaded composite propellants at reduced viscosity by employing near critical liquid (NCL) carbon dioxide as a carrier fluid in a volume amount from about 10 to about 20 percent of the volume of the propellant ingredients. A typical composite propellant contains about 88 percent solids by weight, comprised of ammonium perchlorate, aluminum powder, ballistic modifiers, bonding agent, and about 12 percent liquid ingredients by weight, comprised of liquid polymers, plasticizers, and curatives.

b. Statutory Invention Registration, Reg. Number H305, published on July 7, 1987, discloses "Demilitarization of High Burn Rate Propellant containing Ferrocene or its Derivatives" by William S. Melvin and Porter Mitchell. This invention accomplishes removal of about 99.8% to 100% of ferrocene or its derivatives (e.g. Catocene) from composite propellant which is undergoing demilitarization. After recovery of the high dollar value catalyst material, the propellant can be safely handled during further processing using conventional water jet apparatus to cut and remove the propellant from a rocket motor case, for example, after which reclamation of other specific propellant ingredients can take place.

c. U.S. Pat. No. 4,854,982, issued on Aug. 8, 1989, discloses "Method to Demilitarize, Extract, and Recover Ammonium Perchlorate from Composite Propellants Using Liquid Ammonia" by William S. Melvin and James F. Graham. This method removes substantially 100% of the ammonium perchorate from composite propellant in high purity. When large rocket booster units employing thousands of pounds of composite propellant are required to be demilitarized, an environmentally acceptable method is now available to recover a marketable product, ammonium perchlorate oxidizer, from the surplus propellant. This method recycles ammonia following extraction of the ammonium perchlorate from the propellant. Recovering the ammonium perchlorate from the liquid ammonia during liquid-gas phase change is accomplished via a process whereby ammonium perchlorate oxidizer is released in predetermined particle sizes based on liquid droplet sizes and rate of pressure change at a specified temperature. Following this phase change for recovering the ammonium perchlorate, the gaseous ammonia is dried and compressed to liquid ammonia.

The above extensive review of background information teaches that great progress has been made in the demilitarization of composite propellant compositions. There remains a need for a similar process for another type of propellant which contains nitrocellulose and plasticizers therefor. It is recognized that this type of propellant, which is used in certain missiles and explosive, fall into the category disclosed in U.S. Pat. No. 3,711,344 which was issued on Jan. 16, 1973 to Everette M. Pierce and assigned to the United States of America. For these propellants, which are briefly described hereinbelow, there is also a need for a demilitarization or extraction method which can extract special ingredients from them on a large scale by an environmentally acceptable method. Such a method would satisfy a major requirement in the propellant industry.

The extraction and recovery method of this invention is useful with nitrocellulose-based propellants wherein nitrocellulose is a substantial ingredient. These propellants include components wherein the nitrocellulose source ingredient (whether minor portion or major portion of a nitrocellulose source ingredient) is double-base powder (e. g., contains nitrocellulose, nitroglycerine, and stabilizer), single-base powder (e.g., contains only nitrocellulose and optional stabilizer), or plastisol grade nitrocellulose, all of which are commercially available and well known in the processing art.

The term "plastisol nitrocellulose" (PNC) propellant is used to described double-base propellants made by slurry mixing and pouring incured propellant into casting molds or rocket motors. PNC propellants are made using ball powder (single or double-base) or plastisol grade nitrocellulose. PNC propellants, when freshly mixed, are fluid and free-flowing, usually less than one kilopoise in viscosity at room temperature.

Processing of crosslinked nitrocellulose propellants and crosslinked plastisol nitrocellulose (XL-PNC) involves mixing and heating the selected propellant ingredients (except the second and major portion of the nitrocellulose source ingredient plus a suitable amount of crosslinker), so that any residual moisture will react with a first portion of an isocyanate. Heating above 85° F. and within a range of temperature from about 85° F. to about 140° F. is preferred. Water and isocyanates react to release carbon dioxide which in turn causes cracks and voids in the cured propellant unless the carbon dioxide is removed from the propellant before casting.

In addition to the nitrocellulose, the other ingredients of a basic propellant mix which can be processed by the process of the above patent includes a plasticizer, stabilizer, and crosslinker. Metal fuel and organic or inorganic oxidizers may be used. The propellant mix may contain one plasticizer compound or the mix may contain two or more plasticizer compounds as disclosed hereinbelow.

The compositional range of propellant grains which can be produced by the process of the above patent can vary greatly, but generally, the ranges of ingredients in the final propellant composition, in percents by weight, are nitrocellulose 5-25, plasticizers 20-60, metal fuel 0-30, oxidizer 0-70, stabilizer 1-2, and crosslinker 0.2-3%.

Most of the conventional propellant ingredients can be used in crosslinked double base propellants. Oxidizers such as ammonium perchlorate, ammonium nitrate, potassium perchlorate, nitronium perchlorate, cyclotetramethylenetetranitramine (HMX), and cyclotrimethylenetrinitramine (RDX) can be used. Metal fuels such as aluminum, zirconium, boron, beryllium, and magnesium can be used.

Plasticizers which can be used are of two types: the energetic or explosive type such as nitroglycerin, butane trioltrinitrate (BTTN), diethylene glycol dinitrate (DEGDN), triethylene glycol dinitrate (TEGDN), trimethylolethane trinitrate (TMETN), and tetraethylene glycol dinitrate (TEGDN), and the inert or non-explosvie type such as triacetin, diethyl phthalate, propyl adipate, and dibutyl sebacate.

Stabilizers are used to stabilize the nitrocellulose and nitrate ester plasticizers during cure and storage. Resorcinal, p-nitro N-methyl aniline, and 2-nitrodiphenylamine are typical stabilizers. Resorcinol, a good stabilizer, is also a colloiding agent for nitrocellulose which helps improve the mechanical properties of XL-PNC propellants.

The diisocyanates (crosslinkers) used have included toluene diisocyanate (TDI), hexamethylene diisocyanate (HMDI), and a prepolymer of polyglycol adipate-toluene diisocyanate (PGA-TDI).

The following ranges for two crosslinked nitrocellulose compositions which are taught in U.S. Pat. No. 3,711,344 include: double-base powder 12.0-16.0, TEGDN 28.0-35.0, BTTN 16.0-0.0, HMX 40.0-0.0 aluminum 0.0-15.0, ammonium perchlorate 0.0-30.0, resorcinol 1.0-1.0, ethylenediamine (EDI, added) 1.0-1.0, and ballistic modifier 3.0-3.0.

The desirability of a method to extract and recover plasticizers from solid propellants, in accordance with recent Environmental Protection Agency (EPA) restrictions limiting OB/OD of hazardous wastes and munitions, is readily recognized as touching all phases of the propulsion and explosives industries. This is based on the fact that civilian Government agencies, such as NASA, as well as DOD and its contractors now experience the impact of these new regulations on the demilitarization of high energy propellants, explosives, and pyrotechnics, commonly referred to as PEP compositions or PEP ingredients.

SUMMARY OF THE INVENTION

An object of this invention is to provide a method that avoids the use of traditional liquid organic solvents to extract and recover soluble liquid plasticizers, their stabilizers, and other specific ingredients from solid propellants and munitions. A further object is to provide a method which employs an inert medium for extracting and removing plasticizers and their stabilizers from energetic solid propellants, munitions, and pyrotechnics. These materials are grouped in a class referred to as PEP compositions or PEP ingredients, and include various plasticizers and their stabilizers.

Carbon dioxide ($CO_2$), as either a near-critical liquid (NCL) or supercritical fluid (SCF), is employed in accordance with this invention to extract plasticizers and their stabilizers from high energy propellant, explosive, and pyrotechnic (PEP) compositions. The properly controlled use of critical fluid $CO_2$ for large scale demilitarization purposes results in complete recovery and reclamation of plasticizers from solid propellants and munitions. The extraction and ingredient recovery method outlined herein provides an environmentally acceptable alternative to traditional open burning and destruction of solid propellants and munitions.

$CO_2$ in the form of near-critical liquid (NCL) or supercritical fluid (SCF) as the extraction solvent offers not only the advantages of an inert solvent, but a solvent from which the extracted ingredients are readily separated when the solvent is changed to the gaseous state. $CO_2$, which exists as a gas under ambient conditions, readily undergoes a gas-to-liquid phase change to NCL conditions when confined and compressed to a pressure of 830 psig or greater at ambient temperature. By further increasing the pressure and temperature of NCL $CO_2$ to 1058 psig and 31.3° C. or greater, respectively, SCF conditions of $CO_2$ are obtained. Under SCF conditions, the physical properties of $CO_2$ are intermediate between those of a liquid and a gas. Like a gas, SCF $CO_2$ expands to fill its container; its density, however, approximates that of a liquid. A solvent in the supercritical state can dissolve substances that it could not significantly dissolve under normal temperatures and pressures. The dissolving power of a supercritical solvent increases with density, which can be changed by manipulating pressure or temperature. In this way its capability as a solvent can be made to be selective.

DESCRIPTION OF THE PREFERRED EMBODIMENT

Near-Critical liquid (NCL) or supercritical fluid (SCF) carbon dioxide ($CO_2$) is an effective solvent for liquid plasticizers and their stabilizers from high energy propellant, explosive, and pyrotechnic (PEP) compositions.

The ideal demilitarization solvent should be totally inert when it is confined, pressurized, and possibly heated in direct contract with an energetic propellant or munition within a rocket motor configuration or similar pressure vessel. The application of NCL and SCF $CO_2$ for extraction and recovery of soluble plasticizers and their stabilizers from propellants and related munitions is essentially ideal since $CO_2$ is nontoxic, nonflammable, noncorrosive, inexpensive, and does not generate any additional toxic or hazardous wastes. $CO_2$ is considered one of the safest possible solvents from a propellant demilitarization viewpoint.

Figure 1:
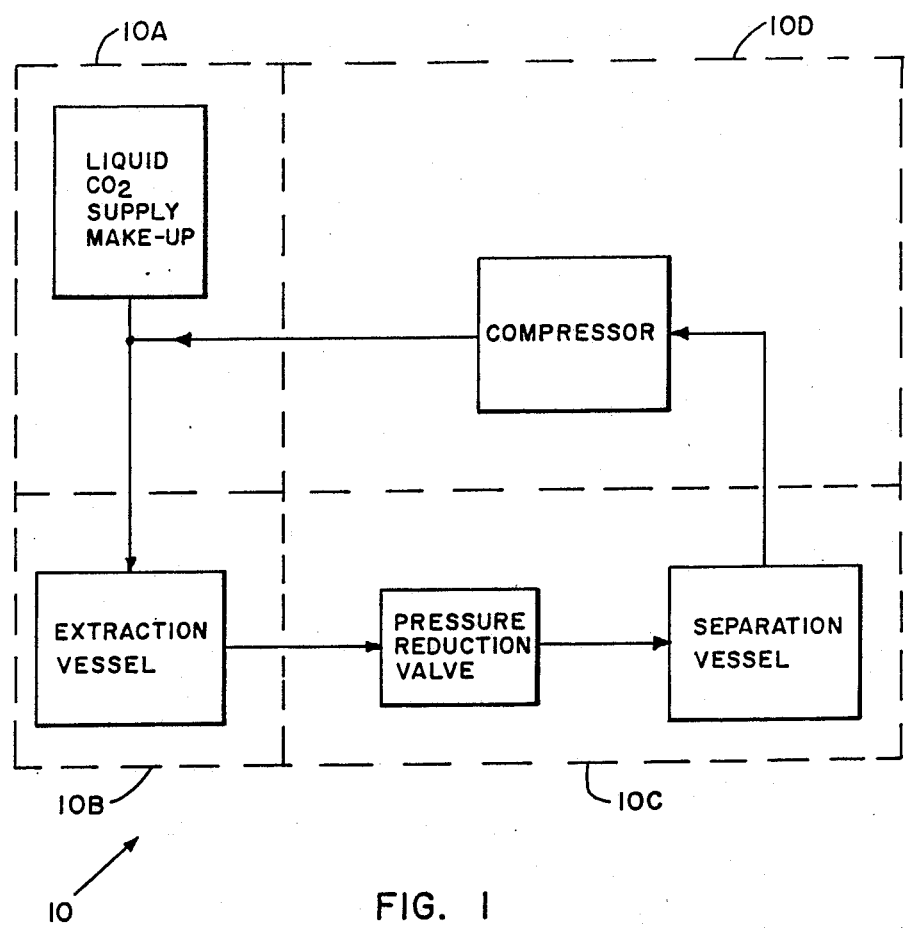
FIG. 1 depicts a simplified flow diagram of the critical fluid extraction process for the recovery of plasticizers and stabilizers from solid nitrocellulose-based propellants and munitions.

A simplified flow chart depicting the NCL $CO_2$ or SCF $CO_2$ extraction process 10, with further reference to FIG. 1 of the Drawing, include a $CO_2$ source aupply 10A, an extraction vessel system 10B, a pressure reduction valve and a separator system 10C (for collecting the material which is dissolved in the NCL or SCF $CO_2$ in the extractor vessel), and a recovery system 10D for $CO_2$. The phase change of the NC or SCF $CO_2$ provides gaseous $CO_2$ which is recycled and compressed to a liquid for further use in the method cycle. For clarity and ease of presentation, ancilliary pumps, filtration devices, valving, facilities for fluid make-up, heat exchangers for heating or cooling the fluid at various points in the process, and other similar equipment are omitted in FIG. 1; however, FIG. 2 shows a more detailed presentation.

Figure 2:
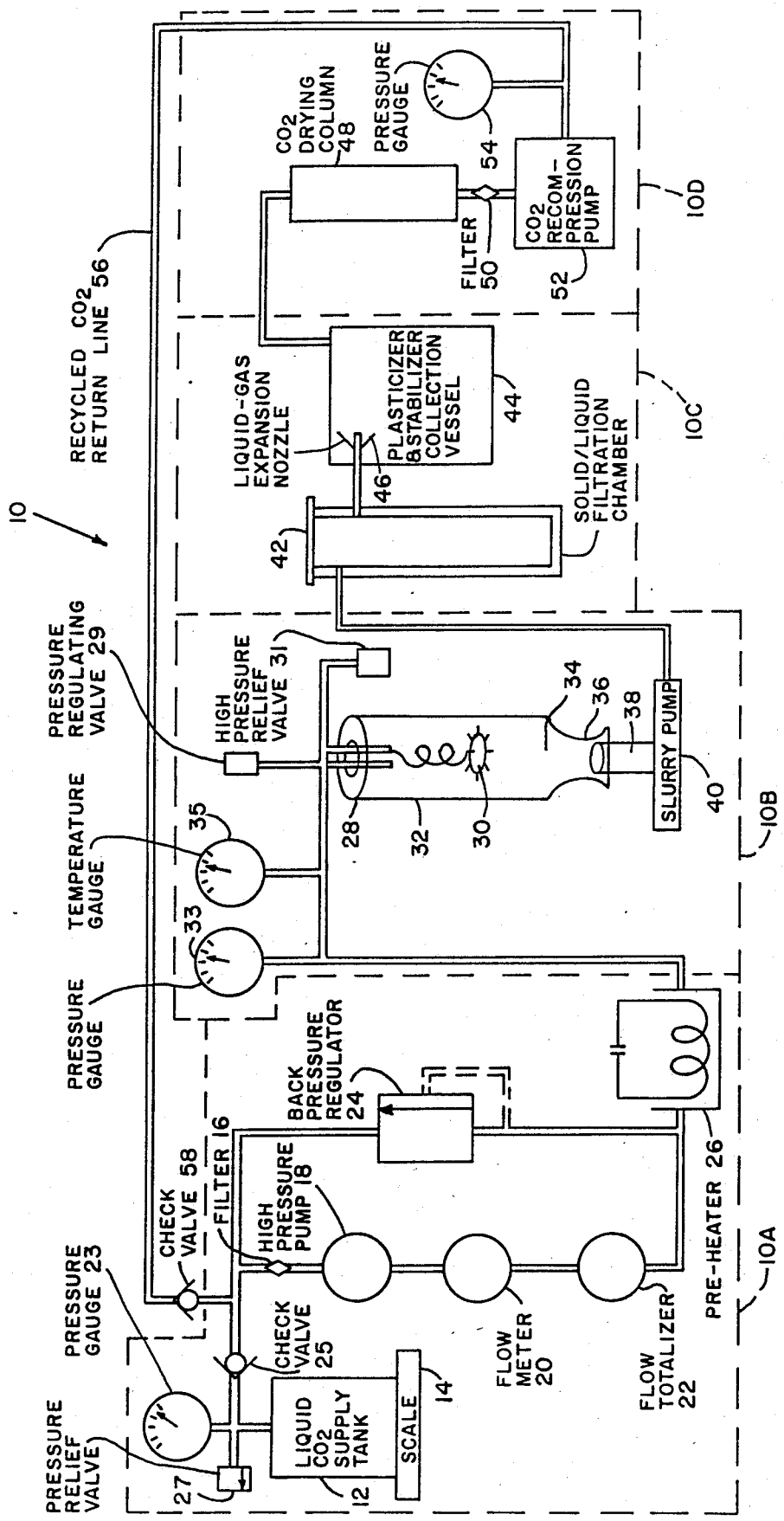
FIG. 2 depicts a detailed illustration of a demilitarization unit with associated hardware comprising a supply and high pressure spray system for NCL or SCF $CO_2$, an extraction system, a plasticizer and stabilizer recovery system, and a $CO_2$ recovery, drying and recycling system.

Refer to FIG. 2 of the drawing which is adapted from my prior co-invention, U.S. Pat. No. 4,854,982. FIG. 2 depicts a modified, detailed demilitarization apparatus suitable for use in the method of this invention. The method of this invention utilizes a demilitarization unit 10 comprising a supply and high pressure spray system for NCL or SCF $CO_2$ 10A, an extraction system 10B, plasticizer and stabilizer recovery system 10C, and a $CO_2$ recovery, drying, and recycling system 10D. As illustrated in FIG. 2, system 10A comprises a liquid $CO_2$ supply tank 12, which is provided with a scale 14 to monitor NCL or SCF $CO_2$ reserve capacity, and accessory items including an in-line filter 16, in-line high pressure pump 18, flow meter 20, flow totalizer 22, back pressure regulator 24, and pre-heater 26. A check valve 25, a pressure gauge 23, and a high pressure safety relief valve 27 are provided for system 10A for controlling the direction of flow and monitoring the supply pressure of the NCL or SCF $CO_2$.

In further reference to FIG. 2 of the drawing, system 10B comprises an extraction system wherein is situated a rocket motor 28 including a rocket motor case with a nozzle portion attached at the aft end thereof. The rocket motor serves as the extraction pressure vessel. The pre-heated, if desired, and pressurized NCL or SCF $CO_2$ is discharged from a spinning (or a conventionally arranged multijet type) spray nozzle 30 (provided with vertical travel capability) to erode the propellant 32 from within the rocket motor case to accumulate a slurry 34 in the nozzle portion 36 of the rocket motor 28 which is positioned with the nozzle portion in the downward position. A suitable piping member with a seal fitting 38 to the rocket nozzle 36 leads to a slurry pump 40 which transfers the resulting propellant slurry in NCL or SCF $CO_2$ to system 10C. A pressure regulating valve 29, a high pressure relief valve 31, a pressure gauge 33, and a emperature gauge 35 are provided to enable control of the pressure and temperature within the selected temperature/pressure range for NCL or SCF $CO_2$ extraction for system 10B.

System 10C, as depicted in FIG. 2, includes a solid/liquid filtration chamber 42 which separates propellant ingredients not solubilized in NCL or SCF $CO_2$. The NCL of SCF $CO_2$ from filtration chamber 42 is transferred on a continuous basis to a plasticizer and stabilizer separator vessel 44 wherein the expansion nozzle 46 achieves gasification of the NCL or SCF $CO_2$ thereby causing the dissolved plasticizer and stabilizer to drop out of solution since the plasticizer and stabilizer is not soluble in gaseous $CO_2$. The gaseous $CO_2$ is then passed through a $CO_2$ drying column 48, then a filter 50, and subsequently to a $CO_2$ recompression pump 52 wherein the pressure is monitored by pressure gauge 54 for the recycled $CO_2$ returned to system 10A through return line 56. A check valve 58 is positioned in return line 56 just prior to the return line connection to system 10A piping which is in communication with liquid $CO_2$ supply tank 12, filter 16, and high pressure pump 18 for return use.

The described method of this invention reveals certain advantages, and other inherent advantages are recognized; however, it appears that a summation, at this time, of these advantages as compared with the disadvantages of the water extraction method focuses further attention to this method for the recovery of a plasticizer and stabilizer such as nitroglycerin and diphenylamine from scrap or solid propellant which is no longer usable. Applicant's invention also provides a method to efficiently extract and recover plasticizers and their stabilizers from solid, PEP source compositions without the attendant problems associated with copious amounts of hazardous waste water generation and treatment. Also, as a direct consequence of the effective extraction of high energy plasticizers and their stabilizers from these PEP source compositions, the method described by this invention avoids the hazard and environmental impacts typically associated with the open burning of large quantities of rocket motor propellants. In addition, the described method allows for the recovery of rocket motor hardware components as a normal consequence of this non-destructive demilitarization method.

The method of extraction and recovery by NCL and SCF $CO_2$ indicates that the solution and extraction efficiencies are a function of both pressure and temperature. The extraction and recovery while using NCL and SCF $CO_2$ is effective for soluble liquid plasticizers and their stabilizers from double base, and crosslinked double base propellants and related munitions. The maximum extraction and recovery efficiency has been experimentally observed to occur when $CO_2$ is under SCF conditions; however, when NCL conditions are employed similar extraction and recovery results are observed as observed under SCF conditions, except at a reduced rate.

The recovery of extracted soluble plasticizers and stabilizers from NCL or SCF $CO_2$ is achieved by allowing the NCL or SCF solvent to undergo pressure reduction and phase change to the gaseous state. When NCL or SCF $CO_2$ solvent undergoes volume expansion, a liquid-to-gas phase change automatically occurs with spontaneous release of all ingredients extracted from the propellant or munition. In this method, all undissolved propellant or munition ingredients are filtered from the NCL or SCF $CO_2$ solvent prior to the pressure reduction/volume expansion recovery cycle. For example, undissolved nitrocellulose or crosslinked double base (XLDB) propellants, respectively, would require physical separation by filtration (or other acceptable means) prior to recovery of the soluble ingredients from the $CO_2$ extraction solvent. Typical plasticizers that have been experimentally recovered from propellants are of the nitrate ester class, such as nitroglycerine (NG) and 1,2,4-butanetriol trinitrate (BTTN), and nitroplasticizer, such as bis(2, 2-dinitropropyl) formal/acetal (BDNPF/A). The method is effective in the simultaneous extraction and recovery of soluble plasticizer stabilizers from munitions undergoing demilitarization. Typical stabilizers which have been amenable to NCL and SCF $CO_2$ extraction include, but are not limited to, diphenylamines and derivatives thereof and nitroanilines (e.g., p-nitro N-methyl aniline).

DB and XLDB propellants are amenable to partial demilitarization using the critical fluid extraction method described herein. The majority of these two types of propellants contain from 20 to 50% nitrate ester or nitro plasticizers which are soluble in NCL and SCF $CO_2$. $CO_2$ has been demonstrated to be a very effective solvent for these highly energetic ingredients and their soluble stabilizers. However, the overall utility of a $CO_2$ solvent system for these propellants will be limited by the amount of plasticizer contained in the particular missile system to be demilitarized. For example, about half the total weight of DB propellants consists of insoluble nitrocellulose (NC) polymers, and they present a difficult extraction problem for all solvent based systems. Plasticizer extractions performed on these propellants leave the remaining insoluble ingredients to be incinerated or reclaimed using alternative methods.

Experimental results suggest the major factors which affect extraction efficiency are functions of propellant physical properties (e.g., porosity, modulus, and solvent permeability rate) and sample configuration (e.g., bulk, shaved, or ground). As the data in Table I show, $CO_2$ extractions were conducted over a wide range of experimental conditions. Results indicate that extractions of DB propellants carried out at pressures of 1800 psi or higher and at temperatures of 50° C. or lower provide optimum operating conditions with plasticizer/stabilizer extraction yields approaching 100%.

TABLE I

Typical $CO_2$ Extractions of Nitrate Ester Plasticizers* and Stabilizers from DB and XLDB Propellants

| Propellant Type/Form | Extraction Temp (°C.) | Extraction Press (psig) | Extraction Time (hrs.) | % Plasticizer Stabilizer Extracted |
|---|---|---|---|---|
| ** | | | | |
| DB/ Bulk | 20 | 830 | 48 | 60 |
| DB/ | 20 | 830 | 48 | 80 |

TABLE I-continued

Typical $CO_2$ Extractions of Nitrate Ester Plasticizers* and Stabilizers from DB and XLDB Propellants

| Propellant Type/Form | Extraction Temp (°C.) | Extraction Press (psig) | Extraction Time (hrs.) | % Plasticizer Stabilizer Extracted |
|---|---|---|---|---|
| Shaved DB/ | 50 | 1800 | 0.5 | 89 |
| Shaved DB/ | 50 | 6350 | 2 | 98 |
| Shaved *** | | | | |
| XLDB/ Ground | 20 | 830 | 24 | 99 |
| XLDB/ Ground | 50 | 1800 | 2 | 100 |

*Nitroglycerin and 1,2,4-butanetriol trinitrate plasticizers with diphenylamine stabilizers.
**DB = Double base
***XLDB = Crosslinked double base This method employs a gas which is used as a nontraditional extraction and separation solvent for the removal and reclamation of soluble plasticizers from solid propellants and munitions. This method utilize $CO_2$ in its NCL and SCF conditions to simulate a tradiional liquid solvent system. Thus, at elevated system operating pressures of 830 psig or greater (compression cycle), $CO_2$ gas undergoes phase change to its liquid or NCL condition. At increased temperatures at or above 31.3° C., and at pressures of 1058 psig or greater, $CO_2$ is in its SCF condition. Under both conditions, $CO_2$ is a suitable solvent for soluble propellant and munition plasticizers. At reduced system operating pressures (volume expansion cycle), $CO_2$ in its NCL or SCF conditions undergoes phase change to its original gaseous state and spontaneously releases (precipitates) all extracted ingredients. By regulating the pressure and temperature of the extraction system, the phase transitions of the critical fluids can be readily manipulated to regenerate the original extraction solvent (100% recovery) and produce a continuous, nonpolluting solvent extraction system.

Operation of a typical demilitarization extraction system is similar to that which occurs in refrigeration and air conditioning systems and, thereby, takes advantage of a well established and mature industrial technology base. The selection of $CO_2$ extraction fluid, the operating pressures and temperatures of the fluid, and the added function of the extraction vessel are essential elements of the process. In the demilitarization process, the rocket motor may serve as its own self-contained, high pressure extraction vessel. The pressure employed is only limited by the burst strength of the rocket motor case and the pressure required to maintain NCL or SCF $CO_2$ conditions. The $CO_2$ fluid solvent may be impinged or nozzle sprayed under sufficient pressure to erode and wash away exposed propellant surfaces. Soluble propellant ingredients are extracted into the fluidized solvent and separated by filtration from all undissolved materials. The dissolved propellant ingredients are recovered down stream in a separation vessel during the pressure reduction cycle. The expanded gas, now devoid of all dissolved propellant ingredients, is recompressed to the fluid state to complete the solvent regeneration cycle.

Because of the pressure-dependant dissolving characteristics of critical fluids, it is possible to design processes to extract, purify, or fractionate material based on changes in pressures at various points in the process. The four basic elements of a fluid extraction process are an extraction vessel, a pressure reduction valve, a separator (for collecting the material which was dissolved in the extractor vessel), and a compressor for recompression and recycling the fluid. FIG. 1 depicts a typical critical fluid extraction process. For clarity and ease of presentation, ancillary pumps, filtration devices, valving, facilities for fluid make-up heat exchangers for heating or cooling the fluid at various points in the process, and other similar equipment are omitted. FIG. 2 is an expanded illustration to show typical hardware needed for the four basic elements. It is recognized that additional hardware components may be used for specific adaptations, e.g.; to make provisions for dilution and periodic removal of NG in accordance with applicable safety regulations. Such adaptations are within the state of the art of routine chemical engineering, and in no way affect the novel features of this invention. Since NCL or SCF $CO_2$ is also a solvent for the stabilizers employed with energetic plasticizers, the plasticizers and their stabilizers are extracted together and separated together during phase change. Suitable diluent fluids would include acetone, trichloroethylene, or other polar solvents which can be removed from the recovered plasticizer and stabilizer prior to being used in a new formulation.

The method of this invention can be practiced without employing a recovery system for $CO_2$. The advantage of this is recognized as being appropriate for demilitarizing propellant, explosive, or pyrotechnic whereby a source of liquid $CO_2$ is brought to the propellant, explosive, or pyrotechnic source which is to be demilitarized, extracted, and recovered. A modification of the extraction process 10, as illustrated by FIG. 1, can be utilized which includes the use of a $CO_2$ source 10A, an extraction vessel system 10B, and a pressure reduction valve and a separator system 10C for collecting the material which is dissolved in the NCL or SCF $CO_2$ in the extractor vessel. It is recognized that a rocket motor per se can, in some situations be employed as the extraction vessel. In other situations, a small rocket motor, explosive, or pyrotechnic source can be placed in the extraction vessel for demilitarizing, extraction, and recovery of plasticizers and their stabilizers in accordance with the method of this invention.

I claim:

1. A method to demilitarize, extract, and recover near-critical liquid (NCL) carbon dioxide or supercritical fluid (SCF) carbon dioxide soluble plasticizers and their stabilizers from high energy propellant, explosive, and pyrotechnic, (PEP) compositions, said method comprising completing the steps of:

(i) providing a demilitarization unit which comprises a supply and high pressure spray system for NCL carbon dioxide ($CO_2$) or SCF carbon dioxide ($CO_2$) operating under predetermined pressures and temperatures required for maintaining NCL or SCF $CO_2$ conditions; an extraction system including an extraction pressure vessel for containing PEP compositions to be demilitarized, said extraction pressure vessel in communication with said supply and high pressure spray system for NCL $CO_2$ or SCF $CO_2$; a soluble plasticizer and stabilizer recovery system in communication with said extraction pressure vessel for receiving a PEP composition slurry contained in said NCL $CO_2$ or SCF $CO_2$; a carbon dioxide recovery system in communication with said soluble plasticizer and stabilizer recovery system for recovering, drying, and recycling the carbon dioxide recovered to said NCL $CO_2$ or SCF $CO_2$ supply system after completing recompression of said carbon dioxide;

(ii) placing a quantity of a PEP composition in said extraction pressure vessel;

(iii) admitting a continuous supply of NCL $CO_2$ or SCF $CO_2$ through said high pressure spray system, said NCL $CO_2$ or SCF $CO_2$ impinging upon said PEP composition to erode and complete high particulate comminution of said PEP composition in NCL $CO_2$ or NCF $CO_2$ to form a slurry of said PEP composition in NCL $CO_2$ OR SCF $CO_2$;

(iv) pumping said slurry into a solid-liquid filtration chamber of said liquid plasticizer and stabilizer recovery system wherein PEP composition solids are separated from NCL $CO_2$ OR SCF $CO_2$ solution of said soluble plasticizer and stabilizer;

(v) passing said NCL $CO_2$ or SCF $CO_2$ solution containing said soluble plasticizer and stabilizer through a liquid-gas expansion system contained in said liquid plasticizer and stabilizer recovery system wherein said NCL $CO_2$ or SCF $CO_2$ is gasified and said liquid plasticizer and stabilizer is released from said NCL $CO_2$ or SCF $CO_2$ containing the same;

(vi) recovering said liquid plasticizer and stabilizer; and, (vii) passing carbon dioxide gas through a drying column of said carbon dioxide recovery system then through a filter and a recompression pump which pressurizes said carbon dioxide gas for recycling said recovered carbon dioxide NCL $CO_2$ or SCF $CO_2$ to said supply and high pressure spray system of said demilitarization unit.

2. The method of claim 1 wherein said PEP composition is selected from double base, crosslinked double base, composite modified double base, plastisol nitrocellulose, and crosslinked nitrocellulose munitions containing a nitrocellulose ingredient, a soluble plasticizer and stabilizer; and wherein said soluble plasticizer is a nitrated PEP ingredient selected from the group of nitrated compounds consisting of nitrate esters and nitroplasticizers.

3. The method of claim 2 wherein said predetermined pressure for maintaining said NCL $CO_2$ is about 830 psig and said predetermined temperature is at an ambient temperature of about 20° C.

4. The method of claim 2 wherein said predetermined pressure for maintaining siad SCF $CO_2$ ranges from about 1058 to about 6350 psig and said predetermined temperature is about 50° C.

5. The method of claim 1 wherein said PEP composition is selected from double base propellant, crosslinked double base propellant, composite modified double base propellant, and plastisol nitrocellulose propellant said propellant containing a plasticizer and its stabilizer, and said PEP source composition containing a nitrocellulose ingredient, a plasticizer and stabilizer; wherein said predeteremined pressure for maintaining said NCL $CO_2$ is about 830 psig and said predetermined temperature is at an ambient temperature of about 20° C.; and wherein said predetermined pressure for maintaining said SCF $CO_2$ ranges from about 1058 to about 6350 psig and said predetermined temperature is about 50° C.

6. The method of claim 5 wherein said plasticizer is a nitrate ester plasticizer selected from nitroglycerin, butane trioltrinitrate, diethylene glycol dinitrate, triethylene glycol dinitrate, trimethylolethane trinitrate, and tetraethylene glycol dinitrate and a nitroplasticizer, bis (2, 2 dinitropropyl) formal/acetal; and wherein said stabilizer is selected from resorcinol, p-nitro N-methyl aniline, and 2-nitrodiphenylamine.

7. The method of claim 6 wherein said PEP composition is propellant selected from double base and cross-linked double base propellant; wherein plasticizers extracted and recovered are nitroglycerin and 1,2,4-butanetriol trinitrate; and wherein said stabilizer extracted and recovered is 2-nitrodiphenylamine.

8. The method of claim 1 wherein said extraction pressure vessel is in the form of a solid rocket motor, wherein said PEP composition is in the form of a solid propellant grain which is contained with the rocket motor case of said rocket motor, said rocket motor case having an attached nozzle portion at the aft end thereof, and said rocket motor being positioned with said nozzle portion in a downward position, and wherein said high pressure spray system includes a spinning, circumventionally arranged multi-jet type, spray nozzle, remotely controlled, and having an up and down displacement action to facilitate said eroding and high particulate comminution of said solid double base propellant grain to effect demilitarization of said double base solid propellant grain and to effect removal of said plasticizers and stabilizers from said case of said solid rocket motor.

9. A method to demilitarize, extract, and recover near-critical liquid (NCL) carbon dioxide or supercritical fluid (SCF) carbon dioxide soluble plasticizers and their stabilizers from high energy propellant, explosive, and pyrotechnic compositions comprising completing the steps of:

(i) placing a propellant, explosive, or pyrotechnic composition in an extraction vessel;

(ii) directing near critical liquid (NCL) carbon dioxide ($CO_2$) or supercritical fluid (SCF) carbon dioxide ($CO_2$) to interior of said extraction vessel under pressure;

(iii) impinging said propellant, explosive, or pyrotechnic composition with said NCL $CO_2$ or SCF $CO_2$ to erode and wash away exposed surfaces of said propellant, explosive, or pyrotechnic composition;

(iv) forming a slurry of propellant, explosive, or pyrotechnic eroded and washed away from said exposed surfaces;

(v) pumping said slurry into a solid-liquid filtration chamber;

(vi) separating solids of said propellant, explosive, and pyrotechnic from said slurry to leave a solution of NCL $CO_2$ or SCF $CO_2$ soluble plasticizers and stabilizers; and, (vii) separating and recovering said soluble plasticizers and stabilizers from said solution.

10. The method of claim 9 wherein the step of impinging further comprises spraying said propellant, explosive, or pyrotechnic composition with said NCL $CO_2$ SCF $CO_2$.

11. The method of claim 9 wherein said NCL $CO_2$ is maintained at about 830 psig and at an ambient temperature of about 20° C.

12. The method of claim 11 wherein said separation and recovering of said NCL $CO_2$ soluble plasticizers and stabilizers is effected by reducing said pressure of NCL $CO_2$ solution of said NCL $CO_2$ soluble plasticizers and stabilizers to effect a phase change of NCL $CO_2$ to gaseous phase $CO_2$ whereby $CO_2$ is separated as a gas and said plasticizers and stabilizers are recovered together in a suitable diluent for class 1.1 explosives as required for safe containment, handling, storing, and transporting the same.

13. The method of claim 9 wherein said SCF $CO_2$ is maintained at pressures which range from about 1058 to about 6350 psig and at a temperature of about 50° C.

14. The method of claim 13 wherein said separating and recovering of said SCF $CO_2$ soluble plasticizers and stabilizers is effected by reducing said pressure of SCF $CO_2$ solution is said SCF $CO_2$ soluble plasticizers and stabilizers to effect a phase change of SCF $CO_2$ to gaseous phase $CO_2$ whereby $CO_2$ is separated as a gas and said plasticizers and stabilizers are recovered together in a suitable diluent for class 1.1 explosives as required for safe containment, handling, storing, and transporting the same.

* * * * *